July 7, 1964 C. L. SHEETS ETAL 3,139,966
ARTICLE CONVEYING AND TRANSFERRING MECHANISM
Filed May 29, 1961 6 Sheets-Sheet 1

Fig. 1

INVENTORS
CARL L. SHEETS,
JAMES R. WHITTED,
BY & ROBERT S. FORESTALL
WATTS, EDGERTON, PYLE & FISHER

B.D.Watts
ATTORNEYS

INVENTORS
CARL L. SHEETS,
JAMES R. WHITTED,
& ROBERT S. FORESTALL
BY
WATTS, EDGERTON, PYLE & FISHER

ATTORNEYS

United States Patent Office 3,139,966
Patented July 7, 1964

3,139,966
ARTICLE CONVEYING AND TRANSFERRING MECHANISM
Carl L. Sheets, Bay Village, Ohio, James R. Whitted, Greenville, S.C., and Robert S. Forestall, Willowick, Ohio, assignors to The American Monorail Co.
Filed May 29, 1961, Ser. No. 113,530
15 Claims. (Cl. 198—38)

This invention relates generally to article handling apparatus and more particularly to apparatus for automatically transferring articles from one traveling conveyor to another conveyor.

There are numerous instances in which partly manufactured articles are transported by overhead carriers from one location to another location where a succeeding operation is to be performed on them. Often the articles vary in size or character which necessitates the performance of different operations on the several articles or performance of a similar operation at different points depending on the differences in the several articles. Accordingly, there has existed for quite some time a need and demand for apparatus which will convey various articles and which will automatically transfer them, while moving, to other preselected conveyors.

The present invention aims to satisfy that demand and need and attains that aim by the apparatus described hereinafter and illustrated in the accompanying drawings in which.

Figure 1:
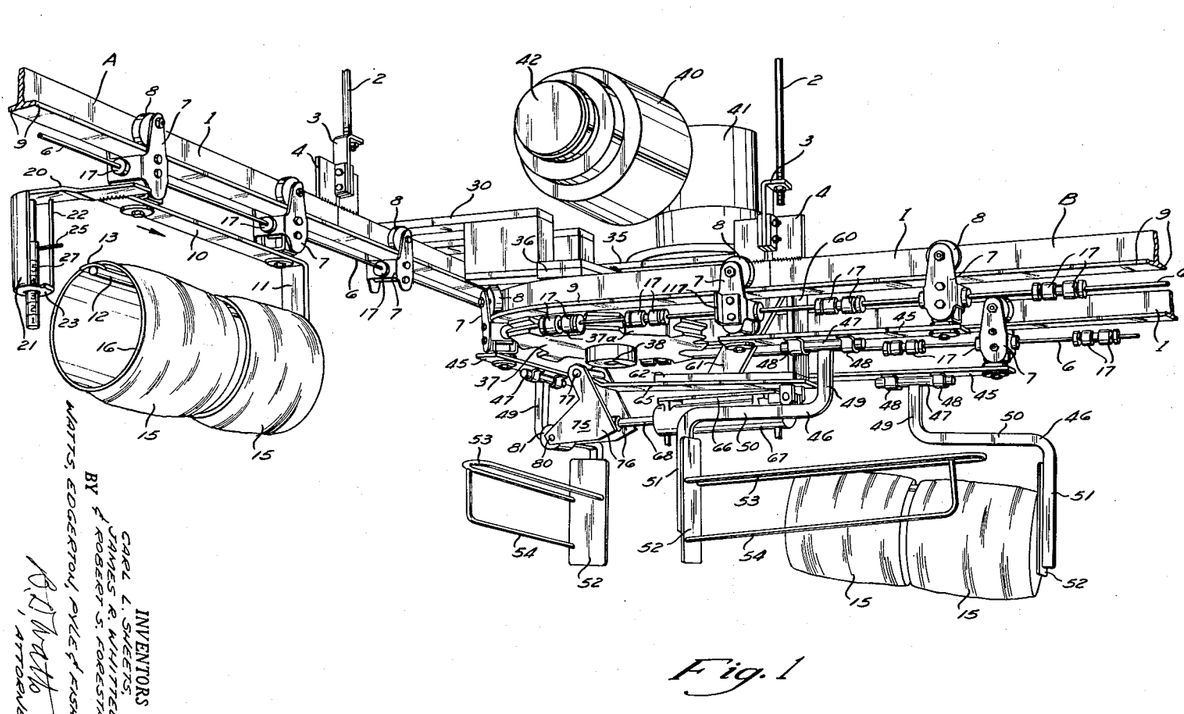
FIG. 1 is a perspective view of one form of apparatus for transferring a certain class of articles from one moving conveyor to another movable conveyor.
Figure 2:
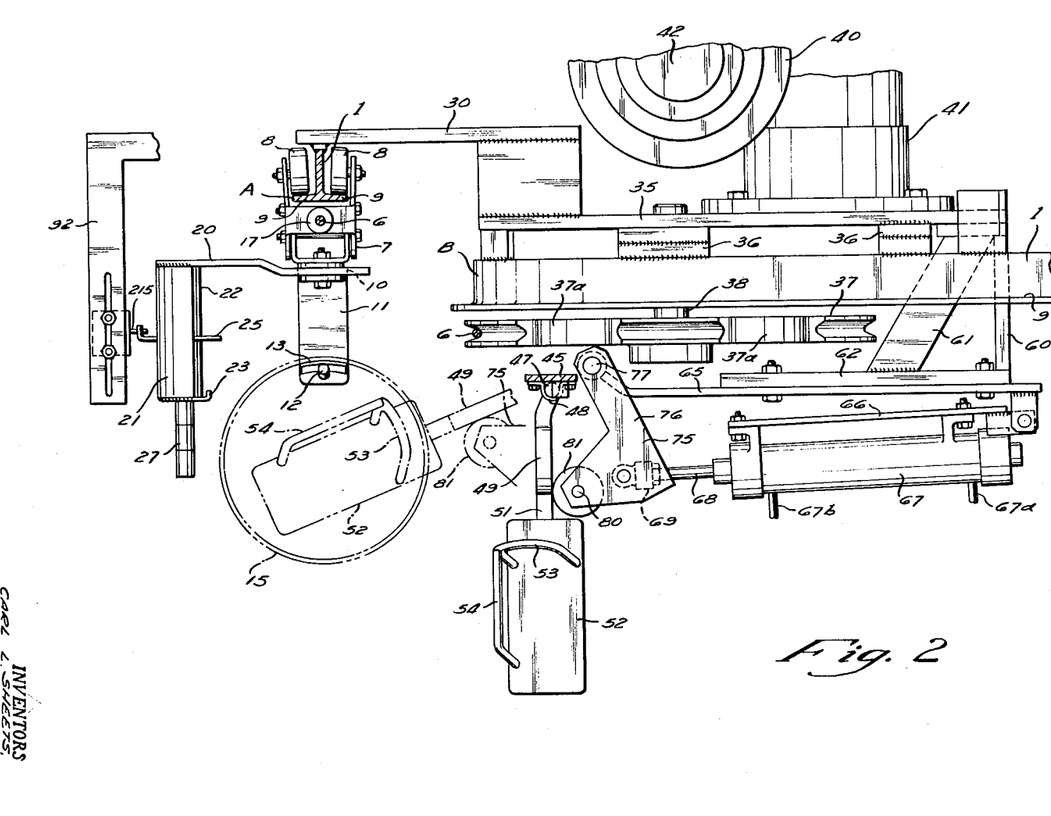
FIG. 2 is a fragmentary, side elevational view of the apparatus of FIG. 1 with certain parts shown in their several positions.
Figure 3:
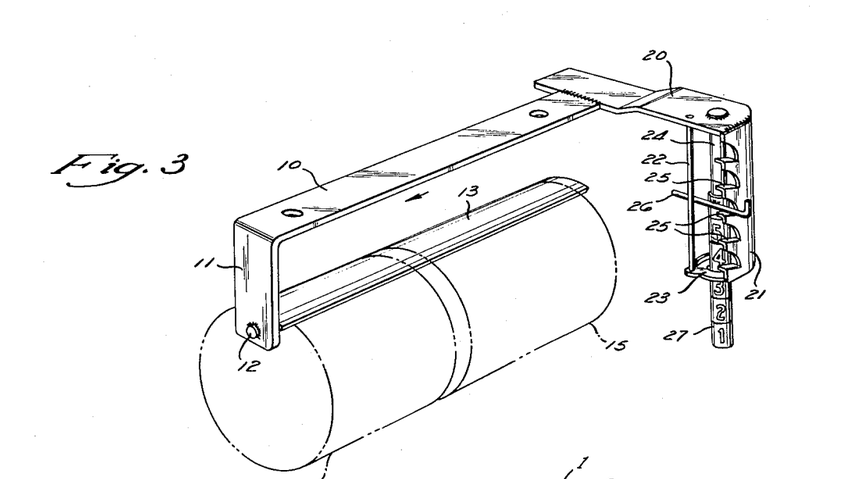
FIG. 3 is a fragmentary view of the station selector and certain associated parts of the apparatus shown in FIGS. 1 and 2.

The form of the present invention for use with hollow cylindrical articles is shown in FIGS. 1 to 7, inclusive. FIGS. 1 to 3 show a first, or forming tunnel, conveyor A consisting of a trolley rail 1 suspended from above, as by vertically adjustable rods 2, on the lower ends of which are mounted hangers 3 connected to bracket 4 which are, preferably, welded to the top edge of rail 1. This conveyor also includes a cable 6 to which is secured, at intervals therealong, trolleys 7 having wheels 8 to run on outwardly projecting lower edge flanges 9 of rail 1. As is shown near the left end of FIG. 1, an article carrier is suspended from two of these trolleys 7. This carrier consists of a carrier bar 10 which is bent downwardly at one end, as at 11, and from which a rod 12 projects parallel to the bar. On the top of rod 12 is secured a circumferentially short, arc-shaped support 13 on which articles 15 may be carried. The illustrated articles 15 are cylindrical, shape-maintaining tubes 16 on which glass strands or threads are wound. Lugs 17 are attached to cable 6 at spaced apart places to engage the trolleys 7. It will be understood that when cable 6 is moved endwise, the illustrated carriage will be moved toward the right in FIG. 1, as indicated by the arrow.

Figure 3A:
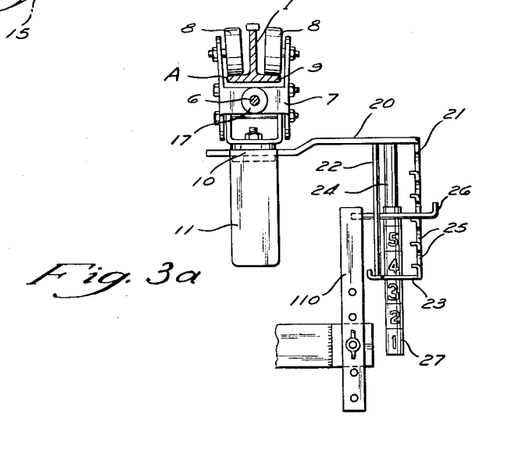
FIG. 3a is a fragmentary view showing means for restoring the station selector to neutral position.

A station selector is attached to each carrier, one being shown in more detail in FIGS. 3 and 3a. Each selector includes a bar 20 which projects laterally from the carrier bar 10 and, at its free end, carries a downwardly extending structure consisting of an arc-shaped member 21, a rod 22, a ring 23 connected to the lower ends of member 21 and rod 22, and a tube 24 which is attached at its upper end to bar 20 and extends down through ring 23. The trailing edge of member 21 is provided with notches 25 for reception of a rod 26 affixed to the upper end of a tube 27 which extends through ring 23 and is slidable on tube 24. When tube 27 is moved upwardly and turned to place one end of rod 26 in one of the notches 25, tube 27 will be retained in that position until the other end of rod 26 engages an abutment and rotates tube 27 to dislodge the rod from notch 25.

FIGS. 1 and 2 also show a second, or surge, conveyor B. Like the first conveyor, this second conveyor includes an endless rail 1 having flanges 9, an endless cable 6 to which trolleys 7 are connected at intervals, each trolley being provided with wheels 8 to run on the flanges 9. The second conveyor is partly supported by rods 2, hangers 3 and brackets 4 like those which support the first conveyor but is additionally supported at the end adjacent to the first conveyor A by plates 30 which rest at one end on rail 1 of the first conveyor and are attached at their other end to a structure connected to rail 1 of the second conveyor. That structure includes a platform 35 attached to brackets 36 which are secured to rail 1, a cable drive wheel 37 suspended below the platform by a shaft 38 and means to rotate the shaft. That means includes a motor 40, reduction gearing 41 supported by the platform and connecting the motor and shaft 38, and an electrical brake 42 for the motor.

The cable 6 of the second conveyor has lugs 17 secured thereto, not only at the trolleys to engage them but also between each pair of trolleys 7 for engagement in pockets 37a in cable-driving wheel 37.

Trolleys 7 of the second conveyor B are connected together in pairs by a load bar 45 and each load bar supports a carriage comprising bar 46 which has an upper portion 47 rotatably mounted in straps 48 connected to the underside of bar 45. Each bar 46 extends downwardly, as at 49, then forwardly, as at 50, and then downwardly, as at 51. Portion 51 has connected to the trailing side thereof, a plate 52 from which a U-shaped rod 53 projects rearwardly and a rod 54 which also projects rearwardly below rod 53 and then upwardly to engage and support the free, looped end of rod 53. As is indicated in the right hand side of FIG. 1, articles 15 are carried on rod 53 after being removed from the carrier member 13 of the first conveyor.

Means is provided for swinging bars 46 in straps 48 when articles are to be transferred from the first conveyor A to the second conveyor B. This means is shown in retracted position in FIG. 1 and in its extreme positions in FIG. 2. It includes a vertical plate 60 and an inclined plate 61 which depend from, and are welded or otherwise suitably connected to, frame 35, and a substantially horizontal bar 62 attached to the lower ends of plates 60 and 61 and projecting forwardly therefrom below and in the direction of travel of cable 6 of the second conveyor.

A forwardly projecting plate 65 is bolted against the underside of bar 62 and, at its rearward end, pivotally supports a plate 66 from which is suspended a fluid cylinder 67 having fluid connections 67a and 67b near its ends. This cylinder encloses a piston (not shown) which is attached to the end of piston rod 68 and the forward end of the latter is pivotally connected, as by fitting 69, to a pusher 75. This pusher comprises parallel spaced apart plates 76 connected at their upper ends by a pin 77 which is pivotally supported in the forward end of plate 65, and at their lower forward ends, are connected by a shaft 80 on which is mounted a roller 81 in position to engage the downwardly extending portion 49 of bar 46. As is shown in dotted lines in FIG. 2, when rod 68 is advanced toward the left, the pusher 75 will bring roller 81 into contact with the portion 49 of bar 46 when the latter is substantially parallel to the first conveyor. Such forward movement of pusher 75 will move rods 53 and 54 into a position within the circumference defined by an article 15 on member 13 of an approaching carrier on the first conveyor. The pusher is held in the actuated position, indicated by the dotted lines in FIG. 2, until the rod 12 on the carrier of the first conveyor has passed beyond the transfer mechanism of the second conveyor.

Preferably, the second conveyor is at rest with the transfer rods 53 and 54 parallel to the first conveyor when the articles are to be transferred from the first conveyor while it is in motion. As soon as the articles are transferred from the first conveyor to the second conveyor, pusher 75 is actuated in the reverse direction whereupon the bar 46 on the second conveyor will move down into a vertical position. Thereupon, the second conveyor will be advanced one step to bring another carriage into position substantially parallel to the first conveyor. Articles so transferred to the second conveyor will be transported thereby, step by step, to the other end of the run of that conveyor where they may be removed manually, or mechanically, as desired.

When only one second or surge conveyor B is in use, the pusher 75 may be actuated to article transferring position whenever the first conveyor brings an article to the transferring position. However, when a plurality of second conveyor B is being used, and each one is to receive an article different from those to be carried by the other second conveyors, triggering mechanism is employed to actuate the pusher of the second conveyors. This triggering mechanism cooperates with the station selectors and, as illustrated in FIG. 2, includes vertical plates 92 supported from rail 1 of the first conveyor and carrying limit switches which are closed by rods 26 of the station selectors. When an article on a carrier of the first conveyor A is destined for a particular second conveyor, tube 27 of the selector of that carrier is moved vertically to bring the rod 26 of that selector into position to close the limit switches of the particular second conveyor to which the articles are to be transferred. Since the rod 26 in that position will not actuate the levers of the limit switches associated with any other conveyor, articles on the carrier whose rod 26 is so positioned will be transferred only to the predetermined second conveyor.

The article transfer means includes, in addition to the station selectors and the triggering mechanism, electrical controls and actuators for the surge line conveyors, as will presently be described.

Figure 4:
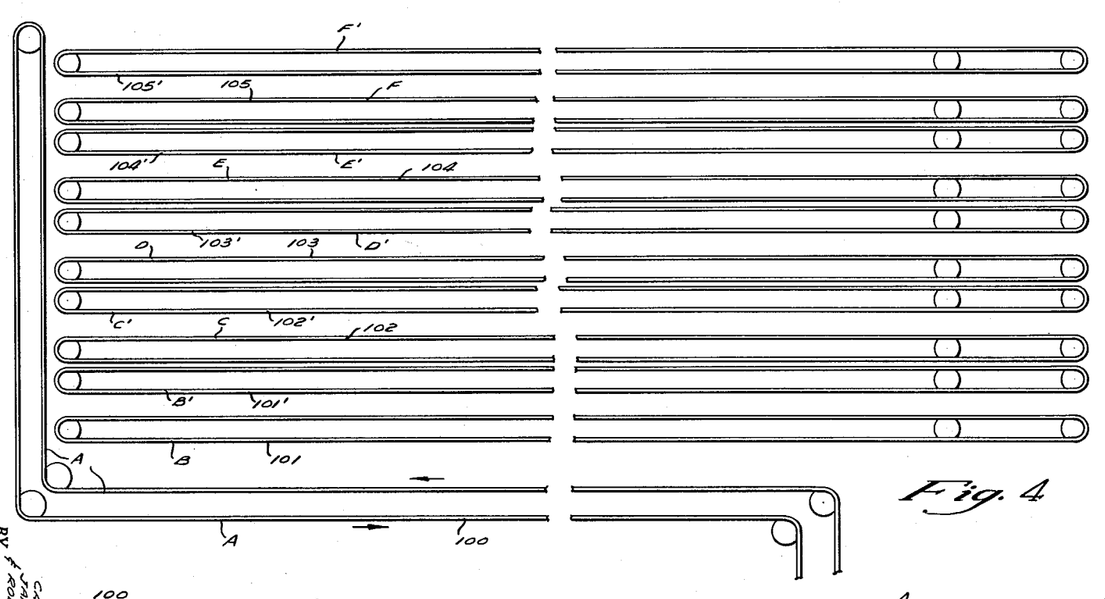
FIG. 4 is a diagrammatic, plan view layout of a plurality of conveyors constituting parts of apparatus of FIG. 1.
Figure 5:
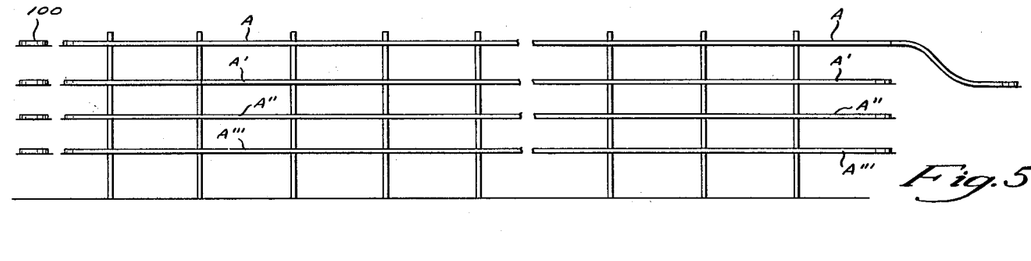
FIG. 5 is a side elevational view of the conveyors of FIG. 4.

FIGS. 4 and 5 show, schematically, the layout of one conveyor A and a plurality of conveyors B and B' arranged to operate in pairs. In FIG. 4 the first conveyor A is indicated at 100. The carriers on this first conveyor are supplied with articles in the forming tunnel (not shown) at the lower right hand part of the figure where the conveyor is shown broken away, and the articles on conveyor 100 are carried along at right angles to a plurality of surge conveyors B and B', C and C', D and D', E and E' and F and F' indicated at 101, 101', 102, 102', 103, 103', 104, 104', 105 and 105', respectively. These surge conveyors are shown in pairs so that if the carriages of one of the conveyors, such as 101, is filled with articles, the other conveyor of that pair, 101', will be available to receive articles from the first conveyor 100 without necessitating the stopping of conveyor 100 or decreasing the rate of production. Articles transferring from conveyor 100 to any one of the ten surge conveyors shown in FIG. 4 may be removed manually or mechanically at the other, right hand, ends of the surge conveyors for the performance of additional manufacturing operations on the articles or for transportation in any desired manner to any other location.

FIG. 5 shows the relative locations of four vertically spaced, or first conveyors A, A', A'' and A'''. These conveyors are disposed in different vertical planes above one another. A set of surge conveyors, like those shown at 101, 101', 102, 102', 103, 103', 104, 104', 105 and 105' in FIG. 4 is provided for each of these vertically spaced first conveyors.

Figure 6:
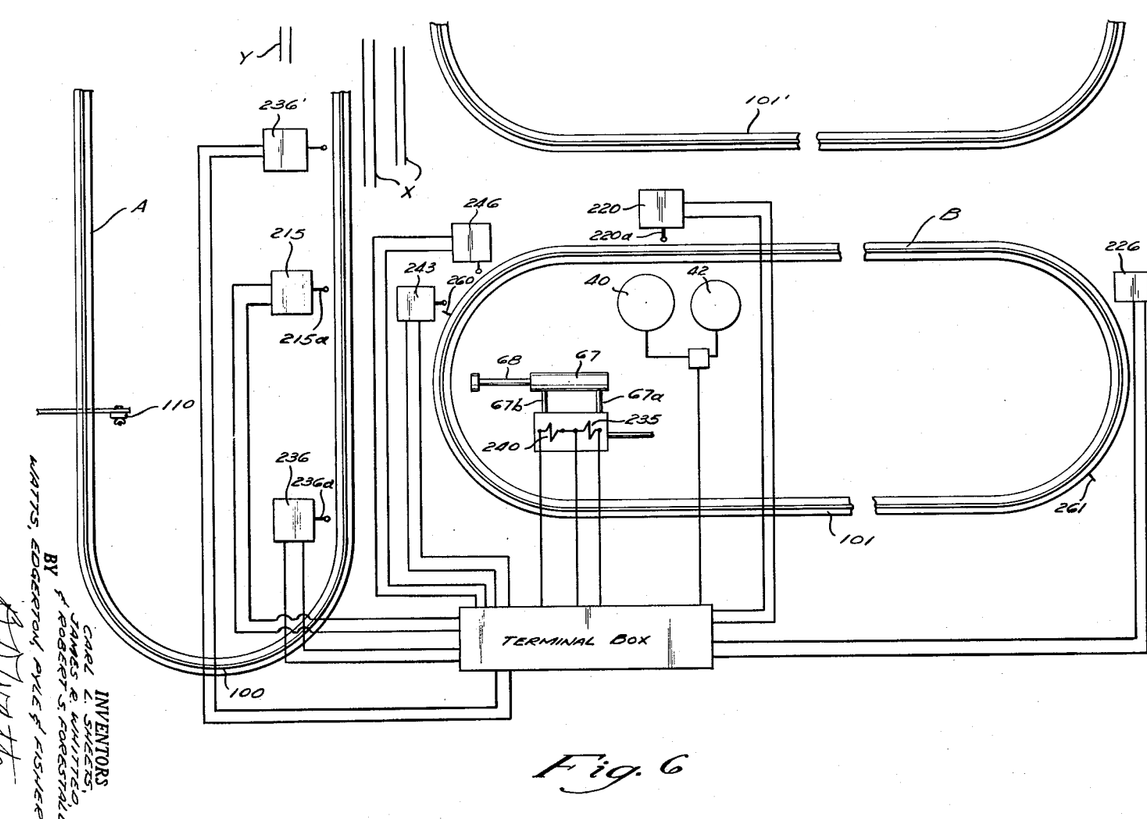
FIG. 6 is a fragmentary, diagrammatic, plan view wiring diagram of part of the apparatus of FIG. 1; and, FIG. 7 shows the wiring diagram of the apparatus of FIGS. 1 to 6, inclusive.

FIG. 6 shows somewhat diagrammatically part of the transfer mechanism described above and FIG. 7 shows other parts of that mechanism including an elementary wiring diagram of the apparatus for one forming conveyor 100 and two surge line conveyors 101 and 101'.

An abutment 110 (FIGS. 6 and 6a) is fixed in position adjacent to the place where the carriers of the first conveyor 100 are to be loaded with articles. That abutment engages the end of each of the selector rods 26 which project toward the carrier as the carriers move therepast and rotates tubes 27 with removal of the other ends of the rods out of notches 25, thereby permitting the tubes 27 with rods 26 to move down until rods 26 rest on ring 23. The selector is then ready to be reset after reloading of the carrier.

Limiting switches 215 and 236 (FIGS. 6 and 7) are spaced apart along main conveyor 100 on opposite sides of the place where an article is to be transferred to surge conveyor 101. Limit switch 236 makes and breaks a circuit to solenoid 235 which controls the flow of fluid under pressure to cylinder 67 to cause piston rod 68 to be advanced and the transfer mechanism to be brought into article-receiving position in the line of travel of the articles on main line 100, as shown in phantom in FIG. 2. Limit switch 215 makes and breaks a circuit to solenoid 240 which controls the flow of fluid under pressure to cylinder 67 to retract piston rod 68; and also makes and breaks a circuit to motor 40, FIG. 1. Limit switch 220 has a lever 220a which is engageable by an abutment 117 on the leading trolley of each carriage on the second conveyor 101. When an abutment 117 engages and actuates the lever 220a, the circuit to the motor is opened and the circuit to brake 42 (230, FIG. 7) is closed with resultant stoppage of conveyor 101 with the following carriage substantially parallel to the first main conveyor A and in position for transfer of an article thereto from conveyor A.

Surge conveyor 101' and its switches and other associated parts are substantially like those of surge conveyor 101.

The circuits for the main and surge line conveyors have connectors in the terminal box indicated in FIG. 6, Y indicating conductors to limit switch 215' and X indicating conductors to limit switches 243' and 246'.

Since the purpose of having two surge conveyors, as 101 and 101', is to be able to transfer articles from the main conveyor more rapidly than they are being removed from a surge line conveyor, means is provided for shifting the transfer operation from a full surge conveyor to an empty one. The means provided for this purpose is shown on FIGS. 6 and 7. It includes empty limit switch 243, latching relay 242, full limit switch 246, unlatching relay 245, abutments 260 and 261 and a foot switch 226 for the first surge conveyor 101, and similar parts 243', 242', 246', 245', 260', 261' and 226' of the second surge conveyor 101'. Abutments 260 and 261 are engageable, respectively, with the levers of empty limit switch 243 and full limit switch 246. Similarly, abutments 260' and 261' are engageable, respectively, with the levers of empty limit switch 243' and full limit switch 246'.

Figure 7:
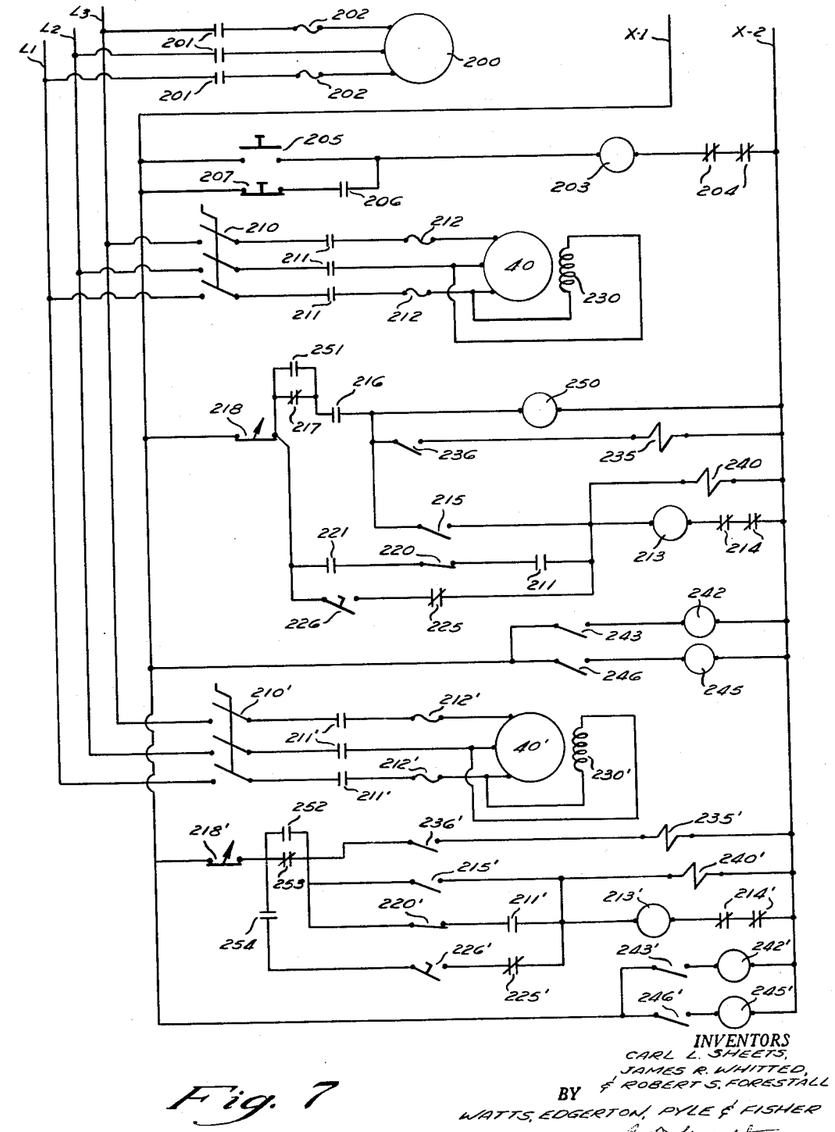

In FIG. 7, the main power circuit includes power lines L1, L2 and L3 for three phase 220 volt, 60 cycle alternating current. The control circuits include conductors X–1 and X–2 for 110 volt, 60 cycle alternating current. The motor 200, which is to propel the forming conveyor 100, is connected to main power lines L1, L2 and L3 through a standard starter which consists of three contacts 201 and overloads 202. This starter includes a starter coil 203 which is connected on one side to X2 of the control circuit through overload contacts 204 and on the other side to X1 of the control circuit through the start button 205, or, alternatively, through starter contacts 206 and a stop button 207.

The surge conveyor controls include a first and second latch relay, connected across X1 and X2. Each latch relay has a latch coil, 242 on the first control and 242′ on the second control. Each relay also has an unlatch coil 245 on the first control and 245′ on the second control. The first latch relay is provided with two normally open contacts 216 and 221 and one normally closed contact 225.

The second latch relay is provided with two normally closed contacts 217 and 225′.

The motor 40 which drives the first surge line conveyor 101 is connected to main power lines L–1, L–2 and L–3 through a standard three-pole, safety switch 210 and the first three sets of contacts 211 of a standard four-pole starter and overloads 212.

The starter coil 213 for motor 40 is connected on one side to control line X–2 through two overloads 214, and on its other side is connected to control line X–1 through limit switch 215, first latch relay contacts 216 and second latch relay contacts 217 and selector switch 218. Starter coil 213 is also connected to line X–1 through the fourth set of contacts 211 of the starter, limit switch 220, first latch relay contacts 211 and selector switch contacts 218. Starter coil 213 is also connected to line X–1 through first latch relay contacts 225, foot switch 226 and selector switch 218.

The first and second set of contacts 211 of the starter of motor 40 serve to energize the brake 230 of the surge conveyor motor 40. This brake is connected on one side directly to first contact 211 and on the other side is connected directly to second contact 211 of the starter of motor 40.

A solenoid 235 is connected on one side directly to line X–2 and on the other side is connected through limit switch 236, first latch relay contacts 216, second latch relay contacts 217 and selector switch 218 to the other control line X–1. Solenoid 240 is connected on one side directly to line X–2 and on the other side is connected directly to coil 213 and both coils are connected to line X–1 through limit switch 215, first latch relay contacts 216, second latch relay contacts 217 and selector switch 218. Solenoid 240 coil also connects to control line X–1 through the same circuits described previously for coil 213.

The latch coil 242 of first latch relay is connected on one side directly to line X–2 and is connected on the other side to line X–1 through an empty line limit switch 243. The unlatch coil 245 of the first latch relay is connected directly on one side to line X–2 and on the other side is connected to line X–1 through a full line limit switch 246.

A timer is connected across line X–1 and X–2 and includes a coil 250 and is provided with one normally open instantaneous set of contacts 251, one normally closed instantaneous set of contacts 252, one normally closed time delay set of contacts 253 and one normally open time delay set of contacts 254. One side of timer coil 250 is connected directly to line X–2 and the other side is connected to line X–1 through first latch relay normally open contacts 216, then through either the second latch relay normally closed contacts 217 and selector switch 218, or normally open instantaneous timer contacts 251 and selector 218.

The circuitry and many of the parts of the second surge line 101′ is quite like those just described for surge line 101. The second surge line has motor 40′ connected to the power lines L–1, L–2 and L–3 through a three-pole safety switch 210′, like switch 210, a four-pole starter 211′ like 211 and overloads 212′ like 212. The starter coil 213′ for motor 40′ on one side is connected through overloads 214′ to control line X–2 and on the other side is connected to line X–1 through limit switch 215′ and timed normally closed timer contacts 253 and selector switch 218′. Coil 213 also is connected to line X–1 through the fourth set of contacts 211′, limit switch 220′, timed normally closed timer contacts 253 and selector switch 218′. The starter coil 213′ is also connected to line X–1 through second latch relay normally closed contact 225′, foot switch 226′, timed normally open timer contact 254 and selector switch contacts 218′.

Solenoid 235′ is connected on one side directly to line X–2 and on the other side to line X–1 through limit switch 236′, timed normally closed timer contacts 253 and selector 218′. This same side of coil 213′ is also connectable to X–1 through limit switch 236′ and timer instantaneous normally closed contact 252 and selector 218′. Solenoid 240′ is directly connected on one side to line X–2 and on the other side is connected through limit switch 215′, timed normally closed timer contact 253 and selector 218′. This same side of solenoid 240′ is also connected to line X–1 through the fourth set of starter contact 211′, limit switch 220′, timer instantaneous normally closed contact 252 and selector 218′. This solenoid is also connected to line X–1 through second latch relay normally closed contacts 225′, contacts of foot switch 226′, timed normally open timer contacts 254 and selector 218′.

The motor 40′ is provided with a brake 230′, like brake 230, and is connected on one side directly to first contact 211′ and on the other side is connected directly to the second set of contacts 211′ of the starter 211′, as in the case of the brake of motor 40.

The latch coil 242′ of the second latch relay is connected on one side to control line X–2 and on the other side is connected to line X–1 through empty line limit switch 243′. The unlatch coil 245′ of second latch relay is directly connected on one side to line X–2 and is connected on the other side to X–1 through full line limit switch 246′.

The operation of the apparatus of FIGS. 1 to 7 is substantially as follows:

To start the apparatus, start button 205 in the energizing circuit of forming tunnel conveyor 100 is pressed whereupon the motor 200 starts and runs continuously until the stop button 207 is pressed. With latch relay 242 of surge line 101 in the latch position and the latch relay 242′ of surge line 101′ in the unlatched position, the selector switches 218 and 218′ of the two surge lines are moved to "on" position and safety switches 210 and 210′ are closed.

When a carrier on conveyor 100 carrying a hollow cylinder 15 approaches line 101 to which those articles are to be transferred, the selector rod 26 engages lever 236a thereby closing switch 236 and energizing solenoid 235 with resultant outward movement of the transfer mechanism including rods 53 and 54 on the surge line conveyor 101 and positions those rods in the path of travel of the cylinder 15, so that the cylinder will pass over the rods until intercepted by the plate 52 of the carriage. Continued movement of the carrier removes parts 12 and 13 from cylinder 15 which is thereupon deposited on the rods 53 of the carriage of conveyor 101.

Continued movement of the carrier brings selector rod 26 into contact with lever 215a of switch 215 and closes that switch, whereupon solenoid 240 is energized, rod 68 is retracted and motor 40 is energized. That motor drives conveyor 101 one step forwardly, that is, until the carriage carrying the just transferred articles brings abutment 117 into actuating engagement with lever 220a of limit switch 220. When that switch is actuated, the flow of current to motor 40 is interrupted and brake 230 is applied.

This just described cycle of operations is repeated until one half of the carriages on surge line conveyor 101 have been supplied with cylinders 15. When that condition comes into being, abutment 260 opens limit switch 243 thereby deenergizing the automatic circuit to conveyor 101 and closing the circuit to conveyor 101'. Thereupon, articles are transferred from the carriers on the conveyor 100 to the transfer mechanism of the second surge line 101' in substantially the same way as has been just described in connection with line 101. When line 101' has been filled with articles, limit switches 243' and 246' were actuated as just described with resultant interruption of the automatic driving of conveyor 101' and the reconnection of conveyor 101 for resumption of its article transferring functions.

After the automatic operation of conveyor 101 has been terminated by reason of its carriages having been filled with articles transferred thereto, this conveyor may be operated a step at a time for the purpose of removing articles from the carriages thereof by actuation of the foot switch 226. An operator may close this switch with his foot and remove articles from the carriers as they pass by him. This conveyor may be stopped by the simple expedient of the operator removing his foot from the switch 226. It will be understood that articles may be similarly removed from the second surge line 101' by the similar use of the foot switch 226'.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modfications of, or substitutions for, parts of the above specifically described embodiment of the invention may be made without departing from the scope of the invention as set forth in what is claimed.

What is claimed is:

1. Apparatus for handling articles comprising an endless, continuously movable, overhead first conveyor having article carrying means suspended therefrom and spaced therealong, a second, endless, overhead conveyor having means suspended therefrom to receive and to convey articles transferred thereto from the first conveyor, and means for transferring articles from the first conveyor directly to the second conveyor, said means including a station selector carried by the first conveyor, trigger mechanism fixed in position adjacent to said article carrying means of the first conveyor and engageable by said selector, and means controlled by the trigger mechanism for moving said article receiving means into and out of the path of travel of said article carrying means, and for moving the second conveyor one step after each article is transferred thereto.

2. Apparatus for handling articles comprising an endless, continuously movable, overhead, first conveyor having article carrying means suspended therefrom and spaced therealong, a second, endless, overhead conveyor having means suspended therefrom to receive and to convey articles transferred thereto from the first conveyor, and means for transferring articles from the first conveyor directly to the second conveyor, said means including a station selector carried by the first conveyor, trigger mechanism fixed in position adjacent to said first conveyor and engageable by said selector, and means controlled by the trigger mechanism for moving said article receiving means into and out of the path of travel of articles on said article carrying means.

3. Apparatus for handling articles comprising an endless, continuously movable, overhead first conveyor having article carrying means suspended therefrom and spaced therealong, a second, overhead, step-by-step movable conveyor having means swingably suspended therefrom to receive and to convey articles transferred thereto from the first conveyor, and means for transferring articles from the first conveyor directly to the second conveyor, said means including a station selector carried by the first conveyor, trigger mechanism fixed in position adjacent to said first conveyor and engageable by said selector, and means controlled by the trigger mechanism for swinging said article receiving means into and out of the path of travel of articles on said first conveyor, and for moving the second conveyor one step after each article is transferred thereto.

4. Apparatus for handling articles comprising an endless, continuously movable, overhead first conveyor having article carriers suspended therefrom and spaced therealong, a second, endless, overhead conveyor having carriages for articles spaced therealong and pivotally suspended therefrom, and means for transferring articles from said carriers to said carriages, said means including station selectors carried by each of said carriers, trigger mechanism fixed in position adjacent to said first conveyor and engageable by said selectors, means controlled by the trigger mechanism for swinging said carriages one at a time up into the path of travel of articles on said first conveyor to remove an article from one of said carriers, and means to move said carriage and article down out of said line of travel after an article has been transferred thereto.

5. Apparatus for handling articles comprising an endless, continuously movable, overhead first conveyor having carriers for articles suspended therefrom and spaced therealong, a second, endless, overhead, step-by-step movable conveyor having carriages for articles spaced therealong and pivotally suspended therefrom, and means for transferring articles from said carriers to said carriages, said means including station selectors carried by each of said carriers, trigger mechanisms fixed in spaced position adjacent to said first conveyor and engageable by said selector, means controlled by the trigger mechanisms for moving said carriages into and out of the path of travel of articles on said first conveyor, trigger means engageable by said carriages, and means controlled by said trigger means for moving said second conveyor one step after each article is transferred to a carriage thereof.

6. Apparatus for handling articles comprising an endless, continuously movable, overhead, first conveyor having carriers for articles suspended therefrom and spaced therealong, a second, endless, overhead conveyor having swingable carriages for articles suspended therefrom and spaced therealong, and means for transferring articles from said carriers to said carriages, said means including stations selectors carried by said carriers, means engageable with said carriages for swinging them one at a time in a vertical plane into the line of travel of articles on said carriages, trigger mechanism fixed in position adjacent to said first conveyor and engageable by said selectors, and means actuated by the trigger mechanism for controlling the action of said carriage swinging means during the transfer of articles from a carrier to a carriage.

7. Apparatus for handling articles comprising an endless, continuously movable, first conveyor having article carriers spaced therealong, two similar, step-by-step movable conveyors having carriages spaced therealong to receive and to convey articles transferred thereto from the first conveyor, and means for transferring a predetermined number of said articles from said carriers to the carriages of one second conveyor and then transferring a predetermined number of said articles from the carriers to the carriages of the other second conveyor, said means including station selectors carried by each of said carriers, trigger mechanism fixed in position adjacent to said first conveyor and on opposite sides of the places of transfer to said second conveyors and engageable by said selectors, means actuated by the trigger mechanism of one of said second conveyors for controlling the transfer of articles to the carriages thereof, and means actuated by the trigger mechanism of the other second conveyor for controlling the transfer of articles to the carriages thereof, means actuated by one of the second conveyors for deenergizing its transfer means when its carriages have received a predetermined number of articles and for energizing the transfer means of the other conveyor.

8. Apparatus for handling articles comprising an endless, continuously movable, overhead, first conveyor having article carriers suspended therefrom and spaced therealong, a second, endless, overhead conveyor having article carriages suspended therefrom and spaced therealong, means for transferring articles from said carriers to said carriages, said means including a station selector carried by the first conveyor, trigger mechanism fixed in position adjacent to said first conveyor and engageable by said selector for controlling movement of the carriages into and out of the path of travel of the carriers, trigger means adjacent to the second conveyor, abutment means movable with the second conveyor and actuated by said trigger means for interrupting the transfer of articles from the carriers to the carriages after a predetermined number has been transferred, and manually controlled means for actuating the second conveyor for removal of the articles from its carriages.

9. Apparatus for handling articles comprising an endless, continuously movable, overhead, first conveyor having article carriers suspended therefrom and spaced therealong, a second, endless, overhead conveyor having article carriages suspended therefrom and spaced therealong, means for transferring articles from said carriers directly to said carriages, said means including a station selector carried by the first conveyor, trigger mechanism fixed in position adjacent to said first conveyor and engageable by said selector, means controlled by the trigger mechanism for moving said carriages into and out of the path of travel of articles on said carriers, means energized by the second conveyor when it has received a predetermined number of articles to deenergize said transfer means, and means energized by the second conveyor when the articles have been removed from its carriages for energizing the article transferring means to resume the transfer of articles from the carriers to the carriages.

10. Apparatus for handling articles comprising an endless, continuously movable, first conveyor having article carriers spaced therealong, at least two second conveyors each having article carriages spaced therealong, means for transferring articles from said carriers to the carriages of the first of said conveyors, means energized after a predetermined number of articles have been received by the carriages of said second conveyor for interrupting the transfer to its carriages, means for initiating the transfer of a predetermined number of articles from the carriers to the carriages of the second of said conveyors after such interruption, and means energized by the first of said second conveyors when the articles have been removed from its carriages and when the predetermined number of articles have been transferred to the carriages of the second of said second conveyors for initiating resumption of transfer of articles from the carriers to its carriages.

11. Apparatus for handling articles comprising an endless, continuously movable, overhead, first conveyor having article carriers suspended therefrom and spaced therealong, a second, endless overhead conveyor having carriages for articles suspended therefrom and spaced therealong, and means for transferring articles from said carriers to said carriages, said means including carriage moving means to move said carriages into and out of the path of travel of articles on said carriers, trigger mechanism fixed in position adjacent to said first conveyor and controlling said carriage moving means, and station selectors carried by said carriers and engageable with said trigger mechanism for actuating the latter, each of said selectors including a vertically movable member having a transversely extending rod engageable with said trigger mechanism and a member adjacent to said vertically movable member provided with notches in which said rod may be positioned.

12. Apparatus for handling articles comprising an endless, continuously movable, overhead, first conveyor having article carriers suspended therefrom and spaced therealong, a second, endless, overhead conveyor having carriages for articles suspended therefrom and spaced therealong, and means for transferring articles from said carriers to said carriages, said means including carriage moving means to move said carriages into and out of the path of travel of articles on said carriers, trigger mechanism fixed in position adjacent to said first conveyor and controlling said carriage moving means, and station selectors carried by said carriers and engageable with said trigger mechanism for actuating the latter, each of said selectors including a vertical rod, a vertical, arc-shaped member having notches in one edge, a ring connected to the lower ends of said vertical rod and said arc-shaped member, a vertically movable tube extending through said ring and having a transversely extending rod engageable with said trigger mechanism and seatable in any of said notches, and means in said tube to guide its vertical movement.

13. Apparatus for handling articles comprising an endless, continuously movable, first conveyor having article carriers spaced therealong, a second conveyor having laterally swingable carriages for articles spaced therealong, and means for transferring articles from said carriers to said carriages, said means including station selectors carried by said carriers, and trigger mechanism for controlling the movements of said second conveyor and its carriages, said trigger mechanism including a limit switch engageable by said station selectors for controlling swinging movement of said carriages into the line of travel of articles on said carriers, a limit switch engageable with said station selectors for controlling the swinging movement of said carriages out of said line of travel and for moving the second conveyor through one step, and a limit switch actuated by said carriages for controlling the stopping of the movement of said second conveyor after it has moved through one step.

14. Apparatus for handling articles comprising an endless, continuously movable, first conveyor having article carriers spaced therealong, two second conveyors, each having laterally swingable carriages for articles spaced therealong, and means for transferring articles from said carriers to said carriages, said means including station selectors carried by said carriers, and trigger mechanism for selectively controlling the movements of said second conveyors and their carriages, said trigger mechanism for each of said second conveyors including a limit switch engageable by said station selectors for controlling swinging movement of said carriages into the line of travel of articles on said carriers, a limit switch engageable with said station selectors for controlling the swinging movement of said carriages out of said line of travel and for moving the second conveyor through one step, and a limit switch actuated by said carriages for controlling the stopping of the movement of said second conveyor after it has moved through one step.

15. Apparatus for handling articles comprising an endless, continuously movable, first conveyor having article carriers spaced therealong, two second conveyors, each having laterally swingable carriages for articles spaced therealong, and means for transferring articles from said carriers to said carriages, said means including station selectors carried by said carriers, and trigger mechanism for selectively controlling the movements of said second conveyors and their carriages, said trigger mechanism for each of said second conveyors including a limit switch engageable by said station selectors for controlling swinging movement of said carriages into the line of travel of articles on said carriers, a limit switch engageable with said station selectors for controlling swinging movement of said carriages out of said line of travel and for moving the second conveyor through one step, a limit switch actuated by said carriages for controlling the stopping of the movement of said second conveyor after it has moved through one step, and a manually actuated switch for actuating said second conveyor after cessation of the transfer of articles thereto and while articles are being removed therefrom.

References Cited in the file of this patent

UNITED STATES PATENTS

| | | |
|---|---|---|
| 1,917,004 | Worrall | July 4, 1933 |
| 2,346,285 | Beaulieu et al. | Apr. 11, 1944 |
| 2,348,112 | Da Costa | May 2, 1944 |
| 2,377,848 | Bailey | June 12, 1945 |
| 2,943,726 | Granath | July 5, 1960 |
| 3,010,560 | Van Schie | Nov. 28, 1961 |

UNITED STATES PATENT OFFICE
CERTIFICATE OF CORRECTION

Patent No. 3,139,966                  July 7, 1964

Carl L. Sheets et al.

It is hereby certified that error appears in the above numbered patent requiring correction and that the said Letters Patent should read as corrected below.

Column 4, line 18, for "6a" read -- 3a --; line 28, for "Limiting" read -- Limit --; column 5, lines 72 and 73, for "confacts" read -- contacts --; column 6, line 27, for "contact" read -- contacts --; column 7, lines 52 and 53, strike out "article carrying means of the".

Signed and this 10th day of November 1964.

(SEAL)
Attest:

ERNEST W. SWIDER                        EDWARD J. BRENNER
Attesting Officer                           Commissioner of Patents